(12) United States Patent
Reus et al.

(10) Patent No.: US 8,201,164 B2
(45) Date of Patent: Jun. 12, 2012

(54) DYNAMICALLY REGULATING CONTENT DOWNLOADS

(75) Inventors: Edward F. Reus, Woodinville, WA (US); Christopher S. Gouge, Redmond, WA (US); Steve P. Shih, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 1083 days.

(21) Appl. No.: 11/780,859

(22) Filed: Jul. 20, 2007

(65) Prior Publication Data

US 2009/0024993 A1   Jan. 22, 2009

(51) Int. Cl.
G06F 9/44 (2006.01)
G06F 9/445 (2006.01)
G06F 15/16 (2006.01)
G06F 15/173 (2006.01)
H04L 9/00 (2006.01)
H04L 12/00 (2006.01)

(52) U.S. Cl. ........ 717/177; 717/172; 717/173; 717/178; 709/225; 709/226; 709/232; 709/235

(58) Field of Classification Search .................... None
See application file for complete search history.

(56) References Cited

U.S. PATENT DOCUMENTS

| | | | |
|---|---|---|---|
| 4,860,251 A | 8/1989 | Bizjak | |
| 6,047,129 A | 4/2000 | Frye | |
| 6,074,434 A | 6/2000 | Cole | |
| 6,374,335 B1 | 4/2002 | Barthel | |
| 6,581,104 B1 * | 6/2003 | Bereiter | 709/232 |
| 6,842,896 B1 * | 1/2005 | Redding et al. | 717/172 |
| 6,930,984 B1 * | 8/2005 | Nomura et al. | 370/254 |
| 6,934,837 B1 | 8/2005 | Jaisimha et al. | |
| 7,013,330 B1 | 3/2006 | Tarbotton | |
| 7,143,193 B1 | 11/2006 | Abbott et al. | |
| 7,165,250 B2 * | 1/2007 | Lyons | 717/177 |
| 7,184,767 B2 * | 2/2007 | Gandolfo | 455/435.2 |
| 7,186,181 B2 | 3/2007 | Rowe | |
| 7,210,143 B2 | 4/2007 | Or | |
| 7,231,445 B1 * | 6/2007 | Aweya et al. | 709/226 |
| 7,353,511 B1 | 4/2008 | Ziese | |
| 7,441,041 B2 * | 10/2008 | Williams et al. | 709/232 |

(Continued)

OTHER PUBLICATIONS

He, J., et al., Internet Traffic Control and Management Architecture, International Conference on Communication Technology, Oct. 22-24, 1998, 5 pages, [retrieved on Feb. 21, 2012], Retrieved from the Internet: <URL:http://ieeexplore.ieee.org/>.*

(Continued)

*Primary Examiner* — Tuan Dam
*Assistant Examiner* — Geoffrey St Leger
(74) *Attorney, Agent, or Firm* — Workman Nydegger

(57) ABSTRACT

A regulation service can deliver software packages to client computer systems while minimizing the overall effect on network (internet or LAN) traffic and/or server loads. In one implementation, the regulation service assigns acceptance rates to different software packages based on any number of different factors. Upon request for a software package, the regulation service can provide the acceptance rate and a refresh rate that differs for each software package. A client computer system can then calculate an access value, and if the access value is within an acceptance rate, the client computer system can access (e.g., download) a corresponding software package. If the access value is outside of the acceptance rate, the client computer system can refresh its requests until it identifies that the acceptance rate has changed, and the calculated value is within the new acceptance rate. Additional implementations include delivering bandwidth management policies to client computer systems.

20 Claims, 4 Drawing Sheets

U.S. PATENT DOCUMENTS

| | | | | |
|---|---|---|---|---|
| 7,512,940 | B2* | 3/2009 | Horvitz | 717/173 |
| 7,512,943 | B2* | 3/2009 | Hester et al. | 717/177 |
| 7,546,595 | B1* | 6/2009 | Wickham et al. | 717/168 |
| 7,555,551 | B1* | 6/2009 | McCorkendale et al. | 709/225 |
| 7,555,749 | B2* | 6/2009 | Wickham et al. | 717/168 |
| 7,584,467 | B2* | 9/2009 | Wickham et al. | 717/171 |
| 7,783,776 | B2* | 8/2010 | Nimour | 709/235 |
| 7,840,960 | B2* | 11/2010 | Miura et al. | 717/177 |
| 7,930,735 | B2* | 4/2011 | Vigelette et al. | 726/6 |
| 2002/0002468 | A1 | 1/2002 | Spagna | |
| 2002/0100036 | A1 | 7/2002 | Moshir | |
| 2002/0143952 | A1 | 10/2002 | Sugiarto | |
| 2002/0174422 | A1 | 11/2002 | Kelley | |
| 2003/0177183 | A1 | 9/2003 | Cabrera | |
| 2003/0200397 | A1 | 10/2003 | McAllister | |
| 2003/0204613 | A1 | 10/2003 | Hudson et al. | |
| 2003/0224787 | A1* | 12/2003 | Gandolfo | 455/434 |
| 2004/0047287 | A1 | 3/2004 | Tremblay et al. | |
| 2004/0073596 | A1* | 4/2004 | Kloninger et al. | 709/200 |
| 2004/0181787 | A1* | 9/2004 | Wickham et al. | 717/168 |
| 2004/0187103 | A1* | 9/2004 | Wickham et al. | 717/168 |
| 2004/0193726 | A1 | 9/2004 | Gatto et al. | |
| 2004/0237084 | A1* | 11/2004 | Kurzweil et al. | 717/178 |
| 2005/0120040 | A1* | 6/2005 | Williams et al. | 707/102 |
| 2005/0144616 | A1 | 6/2005 | Hammond | |
| 2006/0069753 | A1 | 3/2006 | Hu et al. | |
| 2006/0095792 | A1 | 5/2006 | Hurtado et al. | |
| 2006/0294371 | A1 | 12/2006 | Fanning | |
| 2007/0239730 | A1* | 10/2007 | Vigelette et al. | 707/10 |
| 2010/0169484 | A1* | 7/2010 | Okamoto et al. | 709/225 |

OTHER PUBLICATIONS

Li, J., Revere—Disseminating Security Updates at Internet Scale, Dissertation, University of California, 2002, 219 pages, [retrieved on Feb. 21, 2012], Retrieved from the Internet: <URL:http://lasr.cs.ucla.edu/lijun/pubs/lijun_dissertation.pdf>.*

"Resource Optimization for Content Distribution Networks in Shared Infrastructure Environment," by Thanh Vinh Nguyen, Chun Tung Chou and Paul Boustead, date unknown, Telecommunications and Information Technology Research Institute, University of Wollongong, Australia, [online] [retrieved on Mar. 22, 2007], 6 pgs. Retrieved from the Internet: http://atnac2003.atcrc.com/ORALS/NGUYEN-resource.pdf.

"On the Feasibility of Commercial, Legal P2P Content Distribution," by Pablo Rodriguez, See-Mong Tan and Christos Gkantsidis, date unknown, Microsoft Research, Cambridge, UK and Microsoft Corporation, Redmond, Washington, [online] [retrieved on Mar. 22, 2007], 4 pgs. Retrieved from the Internet: http://wiki.schaelle.ch/images/c/cb/Behind_NAT.pdf.

"Digital Rights Management for Content Distribution," by Qiong Liu, Reihaneh Safavi-Naini and Nicholas Paul Sheppard, School of Informatics Technology and Computer Science, University of Wollongong, Australia, Copyright 2003, Australian Computer Society, Inc., [online] [retrieved on Mar. 22, 2007], 10 pgs. Retrieved from the Internet: http://www.itacs.uow.edu.au/research/smicl/publications/aisw2003.pdf.

Jacobson, Van, "Congestion Avoidance and Control", ACM SIGCOMM Computer Communication Review, Symposium proceedings on Communications Architectures and Protocols SIGCOMM '88, vol. 18 Issue 4, Aug. 1988.

Pulido et al., "SM: Real-Time Multicast Protocols for Simultaneous Message Delivery", Real-Time Computing Systems and Applications, 1998, Proceedings, Fifth International Conference, Oct. 1998, pp. 66-73, ISBN: 0-8186-9209-X.

Anzbock et al., "Software Configuration, Distribution, and Deployment of Web-Services", Jul. 2002, ACM, SEKE '02, pp. 649-656.

Phan et al., "Middleware Support for Reconcliing Client Updates and Data Transcoding", Jun. 2004, ACM, MobiSys '04 pp. 139-152.

U.S. Appl. No. 10/724,518, mailed Jul. 30, 2007, Office Action.
U.S. Appl. No. 10/724,518, mailed Jan. 23, 2008, Office Action.
U.S. Appl. No. 10/724,518, mailed Jul. 23, 2008, Notice of Allowance.
U.S. Appl. No. 10/966,621, mailed Jul. 17, 2007, Office Action.
U.S. Appl. No. 10/966,621, mailed Feb. 20, 2008, Office Action.
U.S. Appl. No. 10/966,621, mailed Oct. 20, 2008, Office Action.
U.S. Appl. No. 10/966,621, mailed Mar. 13, 2009, Notice of Allowance.

* cited by examiner

DYNAMICALLY REGULATING CONTENT DOWNLOADS

CROSS-REFERENCE TO RELATED APPLICATIONS

N/A

BACKGROUND

1. Background and Relevant Art

As computerized systems have increased in popularity, so have the complexity of the software and hardware employed within such systems. In general, there are a number of reasons that drive software and hardware changes for computerized systems. For example, as hardware capabilities improve, software often needs to change to accommodate new hardware requirements. Similarly, as software becomes more demanding, a similar effect occurs that can push hardware capabilities into new ground. In addition to these reciprocating push forces, end-users continue to demand that software and hardware add convenience by improving automation of certain tasks or features, or by adding automation where none previously existed. Generally speaking, the need to change or otherwise update software can be driven as a consequence of a changing world, new opportunities, and new ways to take advantage of what is currently available.

For at least these reasons, software is continually being developed and updated. In some cases, new software programs are written entirely from scratch, while in other cases, some software programs receive ongoing, incremental updates. One challenge with regard to delivering these new software programs (or updates thereto), therefore, is to implement appropriate mechanisms to adequately ensure that those client computer systems (often a large audience) that need the new software can receive it as appropriate. At least some conventional mechanisms for distributing software updates include providing the software updates at a network location (e.g., internet or local network server), whereby the user can receive (the server pushes the update) or otherwise download (automatically or manually request/download) the update over a network connection.

Often, software delivery is now done using automated delivery mechanisms. For example, a home user may implement an update program that automatically checks for and downloads software packages (e.g., updates) every evening on a scheduled basis directly from a content server. Similarly or alternatively, the user's work computer may be configured to request and download software updates at least partly from a local work server. In either case, delivering content to a client computer system can invoke a whole host of concerns related generally to network traffic, as well as server load in handling connection-oriented downloads. How the network traffic and load balancing concerns are managed can depend on whether managing these issues on a local network or on an internet-wide basis.

In general, organizations tend to have (or want to have) more control over their own network traffic and connection load. Such organizations may attempt to maintain such control at least in part by organizing content delivery among computer groupings. For example, organizations may designate certain computer systems as part of an administration group, an accounting group, an engineering group, etc. The organization can then prioritize and manage software update delivery on a group-by-group basis, where each group has a different need, network region load, and other priorities or constraints. For example, the organization may designate a resource usage policy that states that "management" can only use up to some percentage of the network infrastructure, saving the bulk of network resources for other operations.

Network traffic management on an internet-wide basis (e.g., software vendor), however, tends to be more complex at least in part since it is difficult or impractical to limit content delivery to certain groups at a time. As such, internet-wide mechanisms for managing network traffic include limiting the numbers of clients that connect within certain periods. For example, a server may provide a requesting client with a random number, which, if the client can match the random number with a particular number in a file, the client can then connect and download any desired software updates. If there is no match, the client system may need to wait a predetermined period before contacting the server, and then request the update again until finding a match that allows connection and download.

In either case (local intranet, or internet), one can appreciate that managing network traffic can be very difficult with certain high demand software packages, such as important security (or otherwise critical) software updates. In these types of situations, network traffic management techniques tend to be less useful since there are an increased number of manual user requests during the same, relatively short period of time. Even with organizational servers, the increases in network traffic due to the additional requests can be overwhelming since organizational servers tend to be much smaller, and less resource-capable compared with internet servers.

With high demand software packages, connection-oriented downloads (e.g., using TCP/IP) can place a significant burden on content servers. For example, a server (or server farm) may need to manage millions of different current network connections for a software update, and further manage the denial of network connection requests to other computer system that cannot be currently handled. Such problems can be particularly acute when providing large software files (or a large set of several software files over a short time) that involve relatively long connection times. A similar effect can occur when announcing multiple software updates in a relatively short amount of time.

Of course, these network traffic and server load concerns are in addition to the ongoing concern regarding network failures that reduce network capacity. For example, some network regions (one or more local or wide area network servers) may experience loss of (or difficulty with) a network tap, have router failure, have DNS configuration problems, or have other types of server hardware/software failures. Similarly, an operational failure at a software delivery center can also create difficulties downstream with software delivery server farms. In particular, network failures can unexpectedly increase loads on other servers in a network path, which may already be at or near peak capacity handling certain high-demand software updates.

These and other concerns are only expected to increase over time, particularly as the numbers of computers, and network-connected computers, continue to increase over time. The sheer increase in computer systems has implications both to the specific software vendor that increases its customer base, as well as to the overall network (e.g., internet) congestion generally. One will appreciate, therefore, that there are a number of issues that can be addressed with respect to managing the delivery of software content over a network.

BRIEF SUMMARY

Implementations of the present invention provide systems, methods, and computer program products configured to manage delivery of software packages to computer systems on a network in an effective, efficient manner. In at least one implementation, for example, a regulation service provides client computer systems with at least an acceptance rate in response to a request for one or more software packages. The client computer systems then generate access values for each software package, which can then be used to distinguish at what point the client computer systems can access any particular software package. Additional implementations relate at least in part to further limiting client access to software packages over a network with adjustable refresh rates, and with bandwidth limitation policies.

For example, a method from the perspective of a server for distributing content in the form of one or more software packages so that network traffic is minimized can include identifying one or more software packages to be delivered to one or more computer systems over a network. The one or more software packages will be separated into priority levels. The method can also involve identifying at least an acceptance rate for each of the one or more software packages. In addition, the method can also involve receiving one or more requests from one or more computer systems for any of the one or more software packages. Furthermore, the method can involve sending to each of the one or more computer systems one or more responses that include the identified acceptance rate for each of the requested software packages.

By contrast, a method from the perspective of a client computer system for computer systems for accessing software content so that network bandwidth is managed effectively can involve sending a request to one or more servers to access one or more software packages hosted by any of the one or more servers. The method can also involve receiving one or more responses that include at least an acceptance rate with each of the requested one or more software packages. In addition, the method can involve calculating an access value for each of the one or more software packages. Furthermore, the method can involve sending one or more new requests to the any of the one or more servers to access the one or more software packages based on the calculated access value.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

Figure 1A:
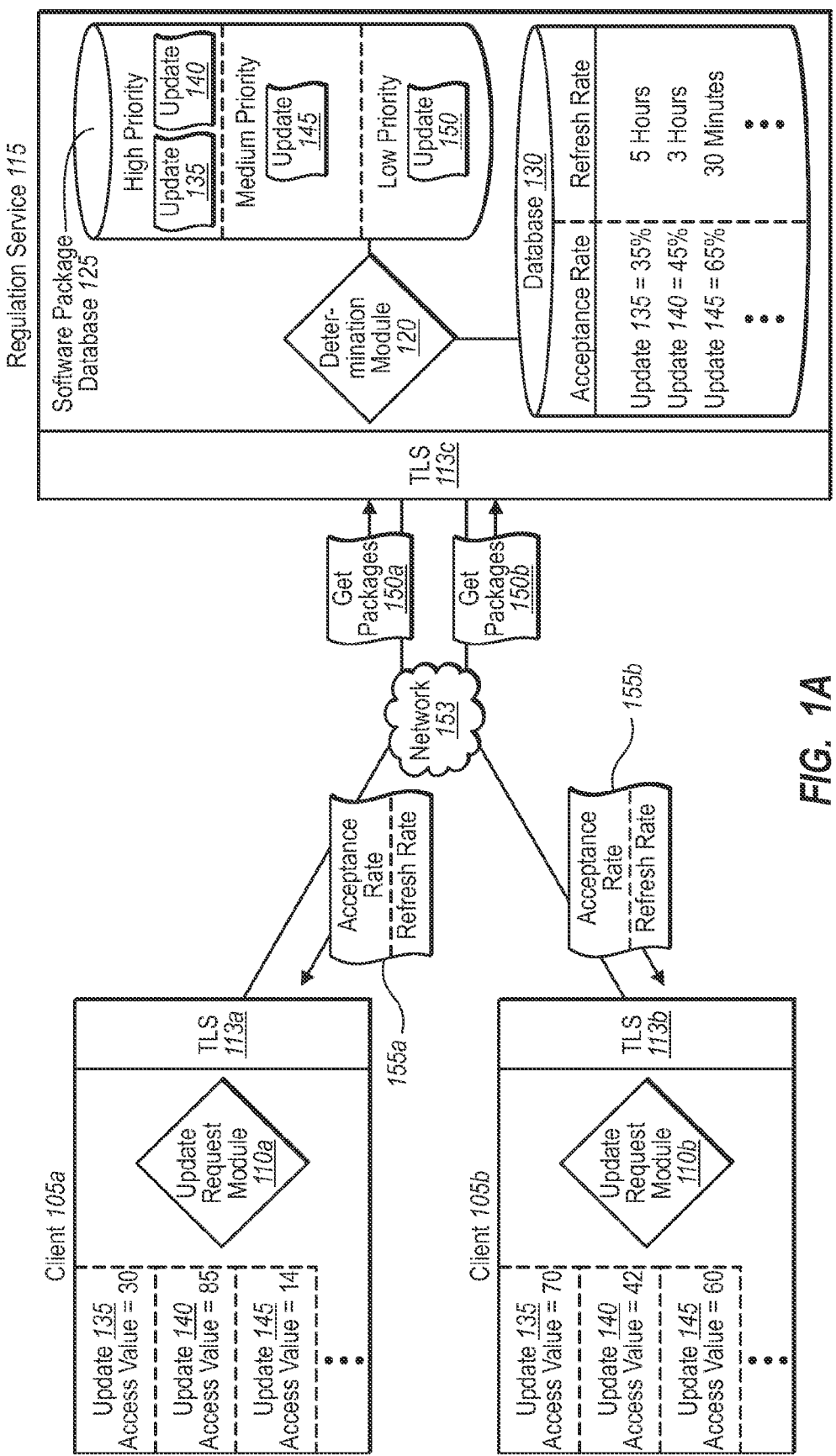
FIG. 1A illustrates an overview schematic diagram in which a regulation service provides minimized access to one or more client computer systems of one or more software packages in accordance with an implementation of the present invention.

Implementations of the present invention extend to systems, methods, and computer program products configured to manage delivery of software packages to computer systems on a network in an effective, efficient manner. In at least one implementation, for example, a regulation service provides client computer systems with at least an acceptance rate in response to a request for one or more software packages. The client computer systems then generate access values for each software package, which can then be used to distinguish at what point the client computer systems can access any particular software package. Additional implementations relate at least in part to further limiting client access to software packages over a network with adjustable refresh rates, and with bandwidth limitation policies.

As will be understood more fully herein, and by way of preliminary overview, communication between a client computer system and a server (e.g., a regulation service) can be divided into essentially two parts for delivering or otherwise accessing software packages. As a preliminary matter, the term "software package" (or "package") will be understood to mean a fairly wide range of software content including iterative updates to existing software, as well as new software or data that a client may not already have in some other form, whether or not qualifying necessarily as an update as such. In any event, at least one part of the dialog includes the client computer system and server determining what software packages (if any) are needed by the client computer system. In a second part, the client computer is provided with access to the one or more requested software packages after satisfying criteria provided initially by the regulation service (hosted by a content server or server farm), whereby the client computer system accesses or otherwise downloads the software packages.

More specifically, the client computer system and regulation service can engage initially in an authentication/authorization protocol chat. Afterward, the client computer system determines what packages it needs but does not yet have, and obtains a list of packages that it needs. The client computer system can then call the regulation service on the server to determine if it can start downloading any of the packages. In one instance, the regulation service can return a new refresh interval which may differ from the previous value.

For those software packages that the client computer system can download, the client computer system starts the download process. After the received refresh interval has passed, and if there are packages still downloading (or on the list but currently suspended from downloading), then the client computer system can call the regulation service and determine which of the remaining packages it can download. Software packages that are currently being downloaded that no longer meet the acceptance rate test can be suspended from download. On the other hand, packages that pass the acceptance rate test are allowed to continue (or to start) downloading. The last two steps can be repeated after each refresh interval until all packages currently needed have been downloaded by the client computer system.

One will appreciate from the above overview and following details, therefore, that client computer systems can be configured to make one or more requests (e.g., via a web service call) before and during client download of a particular package in order to regulate the download demand of packages. In addition, and as will be explained more fully below, individual software packages can optionally be regulated independently. For example, before starting a download, the client computer systems can be configured to make a web service call that contains a list of one or more packages that it intends to download. The response from the server (i.e., regulation service running at the server) includes acceptance rates for some or all of the packages that client is querying. The acceptance rate is used to determine if the client can download a particular package. If the client does not have a specific acceptance rate returned, it can be configured to use the "global" acceptance rates for the package, such as a global acceptance rate that depends on its published priority (i.e., "High," "Medium," "Low.")

One will appreciate more fully herein, therefore, that each separate acceptance rate may differ per software package. In particular, the client computer system(s) may be able to download some packages but not others as each package can be independently controlled based on factors determined at the server (e.g., regulation service running at the server). For example, the regulation service can indicate to the client which (if any) packages are currently available to it to download.

In addition, and as will also be understood more fully from the following specification and claims, a refresh interval can be used on the client to control the frequency of web service calls. For example, the client makes a web service call (e.g., request for updates or new packages) initially before starting download of packages, and then regularly at an interval (defined by the regulation service) until all packages are downloaded. Each subsequent call to the web service can return a refresh rate value (same or new one) in order to control the package download behavior of the client systems on an ongoing basis. In particular, and after each interval of time in the refresh rate, a new call to the regulation web service method can be made, new acceptance rates (and refresh interval) can be returned, and package download status can be reevaluated for each package that the client is trying to download, or is currently downloading. In one implementation, packages that are currently being downloaded that no longer meet the acceptance rate test are suspended (held), while packages that pass the acceptance rate test are allowed to continue (or to start) downloading.

As will also be understood more fully herein, the refresh interval described above can also be returned for each package that is being individually regulated, and then applied on a per-package basis. Specifically, for example, if the client is downloading two software packages, "P1" and "P2", each of these could have a separate refresh interval (e.g., 2 minutes for P1 and 5 minutes for P2). Accordingly, the next web service call would initially be called for both P1 and P2, then every 2 minutes for P1 until it is downloaded; and every 5 minutes for P2. At each of these calls, the server (via the regulation service) could change the package's refresh interval.

In addition, implementations of the present invention include securing the above-identified web service communication. For example, any or all of the web service calls described above and following can be secured via transport layer security (TLS), secure sockets layer (SSL), or another secure channel, if desired, to protect the communication channel from various security vulnerabilities.

Still further features include the ability to use peer caching for additional network traffic management. In particular, if a client system discovers that it can retrieve a file from a local peer system, then the download regulation for that package can be skipped and its package identifier would not need to be included in the web service request to query download permission on the file. The client can then retrieve the file from the peer directly, and regulation would only be used again where the client can not retrieve the entire file from one or more peers and would go back to the server.

Yet still a further feature described more fully herein includes the notion that content regulation can be extended to an organization's distribution servers. In such a case, organizational networks can take advantage of per-package regulation during the process of deploying software and content within their private networks. For example, the organization can set a software package in the form of a security update to have both a high priority and a high acceptance rate, but alternatively set an operating system service pack to have a lower priority and also have a lower acceptance rate. Such settings by the organization can ensure that the security package is more readily and quickly distributed throughout the organization compared with distribution of the operating system service pack.

In addition, the local organizational server can be configured to direct client systems to get their content from an external regulation service where the client systems have high connectivity to the internet but have a low bandwidth (or more intermittent) connection to their organizational server. This can be used to provide at least two potential solutions: have the clients configured to call the external regulation web service during the download process; and/or have the package regulation flow down through the corporate servers and have the clients call the corporate server's regulation web service.

The first example has the advantage that there would be little delay between changes to the regulation values and reaction within the pool of clients desiring to download the associated package. The second example has the advantage that the corporation could further restrict the download process over any restriction applied by the external regulation service. These and other features can further be extended to control bandwidth usage by clients using an internet gateway device.

Referring now to the Figures, FIG. 1A illustrates an overview schematic diagram of a computerized environment 100 in which a regulation service 115 (i.e., a web service hosted by one or more servers or server farms) provides access to one or more software packages. In particular, FIG. 1A illustrates an implementation in which the regulation service 115 is configured to manage, on a fairly specific basis, the rate at which client computer systems receive software packages over a network. For example, FIG. 1A shows that regulation service 115 can comprise a software package database 125 having one or more different "software packages" to be delivered ultimately to other computer systems, such as client computer systems 105a, 105b.

As shown in FIG. 1A, at least one way in which the software packages can be organized for distribution include placing the software packages into various high, medium, or low priority categories. For example, FIG. 1A shows that software packages 135 and 140 are organized as high priority packages, while software package 145 and 150 are organized as medium and low priority packages, respectively. In general, whether a software package is designated as a high, medium, or low priority package will typically be determined in advance by another, such as by one or more software developers that prepare the software package. In other cases, the priority level may determined automatically by the regulation server 115 based on metadata information included in the software package, or by some other characteristics of the software package itself. For example, regulation service 115 may automatically place software packages related to security into a high priority partition, or may simply recognize that all software packages listed in a particular high priority partition of database 125 are to be considered "high priority," and so on.

In addition to these designations, FIG. 1A also shows that regulation service 115 can differentiate its distribution of software packages on a fairly specific, per-package basis with an indication of "acceptance rate" and "refresh rate" information, as explained more fully below. In particular, FIG. 1A shows that regulation service 115 can further comprise (or correspond with) another database 130, which includes acceptance rate data and refresh rate data that are each correlated with the data in software package database 125. Of course, one will appreciate that databases 125 and 130 need not necessarily be separate databases, as such, and may simply comprise segmentations of data in different storage partitions in the same set of storage devices, or may even be included in the same database, regardless of whether even on the same server as regulation service 115. Furthermore, the software packages of content database 125 and 130 may also be managed on different servers entirely. Accordingly, the particular illustration of databases 125 and 130 within regulation server 115 is done by way primarily of convenience in description.

In any event, FIG. 1A shows that that the information in database 130 can comprise different acceptance rate information and different refresh rate information for each software package. For example, FIG. 1A shows that software package 135 is associated with an acceptance rate of "35%," and a refresh rate of "5 hours," while software package 140 is associated with a "45%" acceptance rate and a refresh rate of "3 hours," software package 145 is associated with a "65%" acceptance rate and a refresh rate of "30 minutes," and so on. A determination module 120 of regulation server 115, therefore, can reference and return this acceptance rate and refresh rate information in response to a request for access to the one or more software packages in database 125.

For example, FIG. 1A shows that client computer systems 105a and 105b connect to regulation service 115 in order to access the one or more software packages 135, 140, 145, 150, etc. In particular, FIG. 1A shows that client computer systems 105a and 105b send one or more software package requests 150a and 150b, respectively, to regulation service 115 over network 153. As a preliminary matter, FIG. 1A shows that clients 105a and 105b communicate with regulation service 115 over network 153 through a secure connection, such as previously described including any one or more of a secure sockets layer (SSL) or transport layer security (TLS) connection. Accordingly, FIG. 1A shows that the clients and server communicate through appropriate connection interfaces 113a, 113b, and/or 113c.

One will appreciate that using a secure connection to communicate between the client computer systems and the regulation service, though not necessarily required per the present invention, can provide a number of different benefits. For example, one benefit of using a secure connection protocol is that the client computer systems 105a and 105b can verify the identity and correspondingly retrieved content from regulation service 115. At least another benefit of using a secure connection is that a malicious entity may be precluded from spoofing acceptance rate information and refresh rate information that the client computer system might otherwise trust from the regulation service.

In any event, one will appreciate that client computer systems 105a and 105b can send the package requests 150a-b for any number of different reasons. For example, clients 105a and 105b may have any number of different automatic update components (e.g., 110a/110b) installed thereon, which, at certain periods of a day or week, automatically send package requests 150a or 150b. In other cases, client computer systems 105a and 105b may send the package requests 150a or 150b in response to one or more user requests. For example, a user might learn that an important security update for certain software has been released, and so the user initiates a local update program on the respective client computer system 105a or 105b, which then sends the package request 150a or 150b to regulation service 115.

In any case, to ensure that regulation service 115 is not overburdened with sending all packages out at the same time, and/or to ensure that network 153 is not overburdened with all of the corresponding connection traffic, regulation service 115 will not immediately provide access to the software packages upon request. Rather, and as previously described, FIG. 1A shows that, after negotiating an initial connection, regulation service 115 sends at least acceptance rate information back to the requesting client computer systems. For example, FIG. 1A shows that determination module 120 receives the package requests 150a and 150b through connection layer 113c, and identifies each of the different software packages that may be available for the request in database 125. Determination module 120 then correlates the available software package information with certain default acceptance rate values in database 130 for each particular software package (or groups of packages). In addition, FIGS. 1A-2 show that determination module (or the like) may also send refresh rate information, though this is not necessarily required in all cases.

FIG. 1A further shows that determination module 120 can then send the acceptance rate (and, in this case, refresh rate) information for each requested software package back to the client computer systems 105a and 105b in one or more response messages. For example, FIG. 1A shows that determination module 120 prepares and returns messages 155a and 155b back to client computer systems 105a and 105b, which receive them through their corresponding connection interfaces 113a or 113b, respectively. In this case, therefore, determination module 120 is sending essentially a default set of values from database 130 back to clients 105a and 105b. In other cases, however, determination module 120 may send modified acceptance rate and/or refresh rate information back to clients 105a, 105b, etc.

For example, determination module 120 may identify various properties of the client computer systems 105a and 105b or even of the network 153 (e.g., portals, servers in the connection path) through which these clients are communicating, and further modify the acceptance rate/refresh rate. In such a case, the determination module 120 could provide stricter (or less strict) acceptance rate/refresh rate information. In one implementation, the determination module 120 can modify the acceptance/refresh rate information to accommodate variances in network 153 traffic compared with other network paths, time of day the client computer systems are requesting the software packages, geographic region from which the client computer systems are requesting the software packages, or the like.

In any event, FIG. 1A shows that the client computer systems 105a/105b receive at least the acceptance rate information in messages 155a/155b via corresponding update request modules 110a/110b. Upon receipt, the corresponding update request module 110(a-b) for each client computer system generates an access value for comparison with the associated acceptance rate. In at least one implementation, for example, the access value is a randomly generated number (e.g., a number between 1 and 100) that request module 110 generates for each identified software package. For example, FIG. 1A shows that client computer system 105a has generated an access value of "30" for software package 135, an access value of "85" for software package 140, and an access value of "14" for software package 145. Similarly, FIG. 1A shows that client computer system 105b has generated an access value of "70" for software package 135, an access value of "42" for software package 140, and an access value of "60" for software package 135. In additional or alternative implementations, an access value can be shared by multiple packages instead of being generated for each package.

In one implementation, the update request module 110 for each client computer system maintains the same automatically generated access value for the duration of the software package process. In additional or alternative implementations, however, the package request module 110 automatically generates a new access value each time it prepares a software package access request to be sent to regulation service 115. In any event, upon creating an access value, the corresponding request module 110 compares the access value to the received acceptance rate. If the access value is within the acceptance rate, then update request module 110 will know that it can access the given software package associated with the given acceptance rate.

For example, FIG. 1A shows that client computer system 105a has generated an access value of "30" for software package 135. Software package 135, in turn, is associated with an acceptance rate of "35%" (e.g., database 130). Since the access value of 30 is within "35%," update request module 110 can now download that particular software package. To do so, update request module 110a sends a new access request to regulation service that, in this particular case, includes its automatically generated access value (i.e., "30") for software package 135. One will appreciate, however, that it is not necessarily required for request module 110a to also send the access request. Nevertheless, in the illustrated implementation, determination module 120 responds by identifying the access value, identifying that the access value is within the current acceptance rate (this could have been changed in the meantime), and providing the software package 135 back to client computer system 105a through the network 153 connection.

By way of explanation, one will appreciate that the client computer system 105 may also simply begin downloading the software package without further interaction from regulation service 115. For example, the client computer system, when an access value is within an acceptance rate, can immediately begin downloading from a peer, rather than from the server directly hosting database 125. Similarly, the client computer system may simply download the software package directly from the server hosting database 125 upon identifying that its access value is within the received acceptance rate. Accordingly, implementations of the present invention include a client computer system 105 essentially governing its own package access actions based on the regulated acceptance rate and/or refresh rate information received (or continually received) from regulation service 115.

In any event, FIG. 1A shows that client computer system 105b has (via request module 110b) generated an access value of "70" for software package 135. Since this access value is outside of the acceptance rate of "35%" for software package 135, package request module 110b knows it cannot download software package 135 at this time. Furthermore, and based on the refresh rate received in message 155a, package request module 110b knows it cannot even initiate a subsequent access request to regulation service 115 until after the refresh rate period has lapsed. For example, FIG. 1A shows (e.g., database 130) that the refresh rate period for software package 135 is "5 hours." Thus, package request module 110b of client computer system 105b waits in this case at least "5 hours" from its last request (150b) until initiating a new request for software package 135. (One will appreciate, of course, that this or any other particular refresh rate time interval described herein is arbitrary, and used only for purposes of illustration.)

Accordingly, one will appreciate that client access in this type of implementation to a particular software package can be modified by adjusting the acceptance rates at regulation service 115. (Furthermore, server resources or network bandwidth needed to handle each subsequent request can be accommodated by adjusting the refresh rates for each software package on any or both of an automated or manually-directed basis). For example, after some predetermined amount of time, or after the number of requests for a particular software package have subsided somewhat, regulation service 115 can adjust the acceptance rate percentages upward. Along these lines, a network administrator might analyze network demands/traffic and adjust the acceptance rates for all or some of the one or more software packages by some percentage. In particular, the network administrator might adjust the acceptance rates so that that software package 135 is subsequently associated with a "50%" acceptance rate one day (or portion of the day), "75%" the next day (or next portion of the same day), and so on.

In additional or alternative implementations, regulation service 115 can also (or alternatively) be configured to automatically revise each acceptance rate as some function of time, some function of an identified client computer system property, and/or as a function of some other network demand variable. For example, in the first couple of hours (or days) that a high priority package is available, regulation service 115 could be configured to set a very low acceptance rate and a very high refresh rate for packages that are particularly large and particularly important. In particular, the regulation service 115 could associate an acceptance rate of "20%" with software package 135 in the first few hours, and set a refresh rate of "5 hours."

Such numbers would ensure that 80% of the client computer systems that request access in the first few hours will not be able to access the given software package until a few more hours (i.e., 5 hours in this example) have passed. After the first 5 hours have passed, regulation service 115 could be configured to automatically revise the associated acceptance rate for software package 135 to about "60%," with a refresh rate of "3 hours." Such numbers would ensure that, of the initially rejected 80%, only 50% of the remaining client computer systems will be able to connect to and download the software package 135 over the next 3 hours.

Such revisions by regulation service 115 (and/or by the network administrator thereof) could continue until the demand for the particular software package 135 is relatively inconsequential. In particular, after some amount of time (e.g., first few hours or days) after which the number of access requests for a particular software package have peaked, the regulation service 115 could modify the acceptance rate to about 90-100% with a refresh rate of several minutes and so on. Similarly, the regulation service 115 could randomize client access to software packages across non-peak times. Ultimately, the upward adjustments of the acceptance rate, and downward adjustments of the refresh rate, will ensure that any client computer system will be allowed to access and download that particular software package after some acceptable time.

In an additional or alternative implementation, the regulation service 115 has still greater control over downloads of software packages (135, 140, etc.), and may not even send the acceptance rate information to the client computer system (105) at all. For example, the regulation service 115 can be configured to automatically generate and maintain acceptance rate information for comparison with access values contained in access requests. In some cases, the regulation service 115 could even generate the acceptance rate each time it receives an access request (150) and corresponding set of access values for each software package from the client computer system. Nevertheless, in this implementation, the regulation service 115 might not ever send the acceptance rate information to the client computer system 105.

For example, the client computer system 105 can first identify the available software packages, and continually send access requests (e.g., in accordance with refresh rates) to the regulation service 115 (or server hosting database 125). Each access request (150), in turn, will necessarily include a client-generated access value (whether the same or different for each access request) for each identified software package of interest. In response, the regulation service 115 (e.g., via determination module 120) could be configured to thus grant an access request only when the received access request from the client computer system includes an access value that is within the present version (maintained by the regulation service) of the acceptance rate for a particular software package.

In these types of implementations, therefore, and referring again to FIG. 1A, client computer system 105b would be unable (using the illustrated values) to access software package 135 until the acceptance rate for software package 135 at regulation service 115 has been adjusted or otherwise revised to (or above) "70." Therefore, client computer system 105b would continue to request software package 135 according to the provided refresh rate (i.e., 5 hours in this case), continually providing its access value (i.e., "70") in each request. Once the acceptance rate for software package 135 has been revised to equal or exceed "70%," client computer system 105b could then download software package 135, as already done by client 105a.

Such a scenario would also occur with the other software packages for which client computer systems 105a/105b had generated access values. In particular, based on the illustrated values of FIG. 1A, client computer system 105a would not be able to initially download software package 140 (i.e., access value of 85 is greater than acceptance value of 45%), but could initially download software package 145 (i.e., access value of 14 is less than acceptance value of 65%). Similarly, though prohibited from initially downloading software package 135, client computer system 105b would be able to initially download software packages 140 and 145 due to the relatively low access values of "42" and "60" compared to associated access rates of "45%" and "65%."

Accordingly, continually revising the acceptance rate (and/or refresh rate) is at least one way in which regulation service 115 can moderate or otherwise minimize usage of network resources when distributing high-demand software packages. Of course, and as previously mentioned, a similar effect could be realized by maintaining effectively the same acceptance rates for each software package indefinitely, and requiring the client computer systems to adjust their access value. In particular, each client computer system 105a/105b, etc. could be configured to create a new access value just before making a new or subsequent access request.

For example, client computer system 105a is initially unable to access software package 140 since its access value ("85") for that software package is much higher than the acceptance rate ("45%"). When client computer system 105a is finally allowed to make a new request (e.g., after "3 hours"), the client computer system 105a generates a new access value between 1 and 100. The client computer system 105a then sends the subsequent access request with the new access value to regulation service 115 since there is still the possibility that the acceptance rate have changed. If the new access value does fit (e.g., equal to or less than "45%"), then the client computer system can download software package 140. If the new access value does not fit (e.g., greater than "45%"), then the client computer system 105a will not be able to generate a new access value and make the new request until a newly received refresh value has passed.

In each of the above implementations, one will appreciate that the regulation service 115 effectively ensures that no more than 35% of initial requesters are able to access software package 135 in the first 5 hours, no more than 45% of initial requesters are able to access software package 140 in the first 3 hours, and so on. Accordingly, FIG. 1A and the corresponding text provide a number of components and mechanisms for effectively moderating demand and bandwidth when distributing software packages directly to client computer systems. In contrast, FIG. 1B illustrates a similar scenario, albeit one in which one or more local servers act as the regulation service on a local basis to distribute software packages on a local network.

For example, an organization may be configured with a number of different content servers (e.g., local organizational servers) that are configured to deliver various software packages to computer systems on an organizational network. In this type of environment, the local organization server(s) 170 will typically receive the software packages directly from one or more external regulation services 115 operated by the software vendor, though typically not using the above-described network/bandwidth constraints. For example, the organizations may have a separate agreement to download all packages without consideration for acceptance rates and/or refresh rates as otherwise handled for client computer systems. As such, bandwidth and network resource management is left to the local organization server, and the local organizational server effectively becomes the regulation service.

Figure 1B:
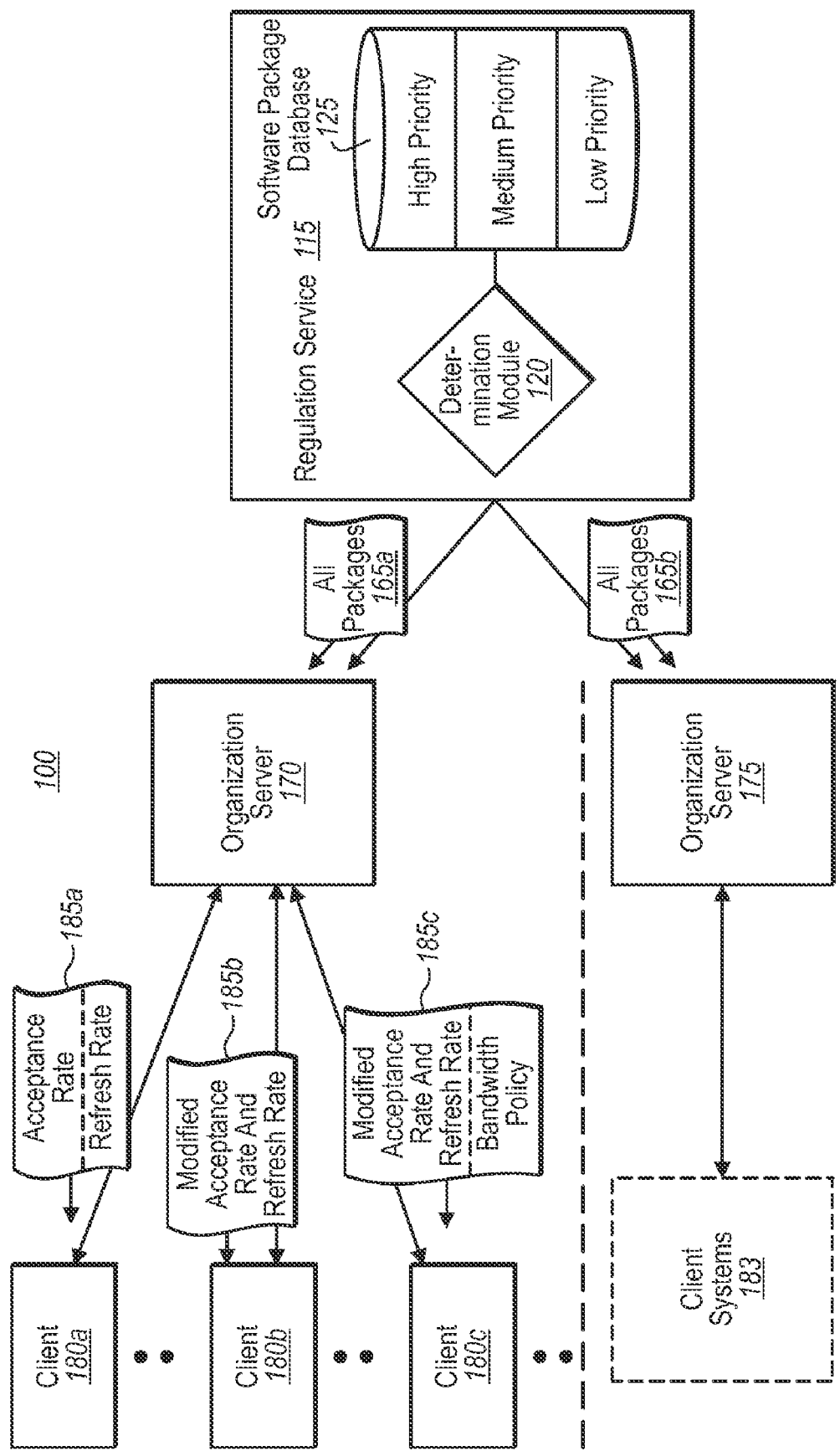
FIG. 1B illustrates an overview schematic diagram in which one or more local servers provide minimized access to one or more client computer systems of one or more software packages in accordance with an implementation of the present invention.
Figure 2:
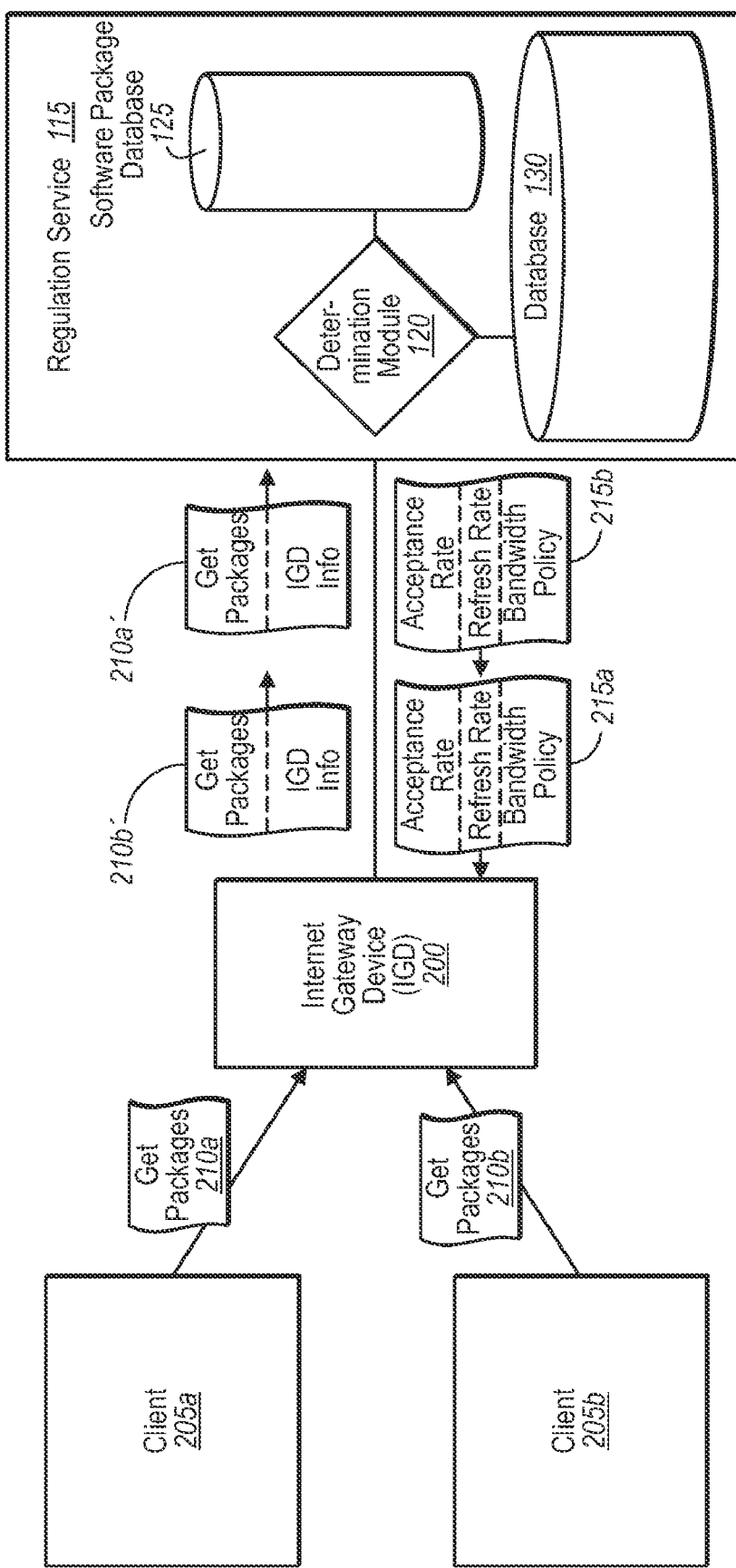
FIG. 2 illustrates an overview schematic diagram in which a regulation service provides minimized access to one or more client computer systems of one or more software packages that access the internet behind an internet gateway device.

For example, FIG. 1B shows that regulation serve 115 prepares and sends all possible (or all requested) software packages via determination module 120 to local organizational servers 170 and 175. Organizational server 170 then distributes some or all of those software packages to its set of client computer systems 180a-c, etc. while organizational server 175 distributes some or all of those software packages to its set of client computer systems 185. More specifically, FIG. 1B shows that organizational server 170 prepares and sends messages 185a, 185b, and 185c to client computer systems 180a, 180b, and 180c, respectively.

Each of messages 185a-c, in turn, comprises a set of acceptance rate data (and, in the illustrated example, refresh rate data), which can be used by each client computer system to access the given software packages from organizational server 170, as previously described. In this particular implementation, however, local organizational server 170 further packages one or more of messages 185a-c with additional client computer system-specific information. In one implementation, the acceptance rate and refresh rate are simply the default values sent from regulation service 115. For example, message 185a simply indicates that it includes "acceptance rate" and "refresh rate" information. In other cases, the acceptance rate and refresh rate can be "modified" by organizational server 170 depending on any number of factors. For example, FIG. 1B shows that messages 185b and 18bc include "modified" acceptance rate and refresh rate information.

In general, the information used to modify these acceptance and refresh rates could be based on any number of local area network properties (e.g., connection speeds, network quality, server load, etc.), specific client computer systems properties, or the like. The modifications can also be based on whether the client computer system needs a particular package relatively soon (or not at all) compared with other client computer systems. For example, client computer systems using one type of application program in an accounting department may have a more immediate need for one type of software package than those using that application program in an engineering department. In additional or alternative implementations, the client computer systems in one department may have a relatively weak local area network connection capability, but a relatively strong internet connection capability.

As a result, organizational server 170 could send a modified acceptance rate of 90% and a refresh rate of 1-2 minutes for software package 135 to all computer systems in an accounting department, and further send a modified acceptance rate of 10% and a refresh rate of 4-5 hours for software package 135 to all computer systems in the engineering department. In addition, and due to any number of bandwidth concerns, organizational server 170 could further send one or more bandwidth policies with the acceptance rate and refresh rate information. As previously mentioned, for example, FIG. 1B shows that organizational server 170 has sent "bandwidth settings" with message 185c. In one implementation, the bandwidth settings include information regarding how much of the network bandwidth can be used by any one particular client computer system.

For example, bandwidth settings could include instructions that no more than 10% of the client's allotted bandwidth be used during download of a particular software package. In other cases, such as with larger, less important, or non-organization-specific software packages, the bandwidth settings could include further instructions that point the client computer system (e.g., 180c) to an external server, such as one or more servers hosting regulation service 115 (and/or database 125). As a result, client computer system 180c could be instructed via the modifications and/or bandwidth policies to get certain organization (or department)-specific software packages (e.g., 135, 140) via organizational server 170, but get other software packages (e.g., 150) directly from regulation service 115. In both cases, the client computer system can be provided with any given package based on the acceptance rate, access value generation, and refresh rate techniques described above, whether regulated by server 115 or server 170.

FIG. 2 illustrates yet another implementation for practicing one or more aspects of the present invention. In particular, FIG. 2 illustrates an implementation of system 100 in which a regulation service regulates delivery of one or more software packages through an internet gateway device (or "IGD"). As more and more organizations or even home environments connect to the internet over broadband or other high-speed mechanisms, such an architecture that uses an internet gateway device is increasingly common, both for home and small organizational networks. In this type of environment, client computer systems (e.g., 205a, 205b) will generally connect to a wide area network (e.g., the internet) through an internet gateway device (e.g., 200), such as a broadband modem that also serves as a network router.

In this type of design, the client computer systems behind the internet gateway device will detect a high-speed local area network (e.g., 10/100 megabits per second or higher) though the internet gateway device 200 is connected on the internet at much slower speeds (e.g., 1-5 megabits per second). Accordingly, the client computer systems will generally be unaware of the outside internet connection speed, and thus think that the local area network speed represents the actual bandwidth. This can cause a bottleneck at the internet interface portion of the internet gateway device (200) when two or more client computer systems are trying to download or access large files at the same time. Also, because the local client computer systems believe they have virtually unlimited bandwidth behind the internet gateway device, both client computer systems may be predisposed to using the largest amount of local area network resources to obtain any particular software package. This can further result in excessive use of local network resources that might be better used for other network functions, rather than just downloading software packages.

Accordingly, FIG. 2 shows that clients 205a/205b send one or more access requests 210a/210b for the one or more software packages, as previously described. Messages 210a/210b are then handled by internet gateway device 200, which can append or otherwise add internet gateway device information to each message. For example, FIG. 2 shows that internet gateway device 200 processes messages 210a and 210b to include "IGD" (internet gateway device) information in messages 210a' and 210b'. The IGD information in messages 210a'/210b' can include a wide range of data about the local area network on which the internet gateway device 200 operates. In particular, such information can include the number of client computer systems on the local area network behind the internet gateway device 200, the operating characteristics of internet gateway device 200, the internet bandwidth of internet gateway device 200, geographic region of the internet gateway device 200, or the like.

Regulation service 115 can then process messages 210a' and 210b' through determination module 120 as previously done, but with the added context regarding the bandwidth utilization for internet gateway device 200. For example, in addition to providing acceptance rate (and/or refresh rate information) as before (e.g., message 215a/215b), regulation service 115 can further include information that further restricts bandwidth usage within the local area network serviced by internet gateway device 200. Such information can include the maximum bandwidth percentage of the local area network that a particular client computer system can use when actually accessing/downloading a software package. In one implementation, the internet gateway device 200 is configured to use this information to limit the client computer systems 205a-b in terms of bandwidth utilization, while the client computer systems 205a-b limit their own access of the package(s) in accordance with acceptance/refresh rate information, such as described in FIGS. 1A-1B.

For example, client computer system 205a can send message 210a (via 210a') to regulation service 115, and receive response message 215a, which includes the acceptance/refresh rate value as before, in addition to a requirement that no more than 10% of the local network bandwidth be used. When a given access value matches an associated acceptance rate for a software package, client computer system 205a can then establish a connection (e.g., using TLS) with regulation service 115 to access/download the software package. The internet gateway device 200, however, allows client computer system 205a to establish a connection that is in line with the received bandwidth policy settings from message 215a. In this specific example, therefore, client computer system 205a downloads the allowed software package using no more than 10% of the local area network bandwidth, as regulated by the internet gateway device. In additional or alternative implementations, the client computer system regulates its bandwidth usage alone, rather than via controls from the internet gateway device.

In still further implementations, the internet gateway device 200 operates much like local organizational server 170 described in FIG. 1B. That is, rather than passing bandwidth utilization or other network information (e.g., by appending messages 210a-b), the internet gateway device 200 determines its own throttling behavior. For example, the internet gateway device 200 can be configured to, based on the number of clients on the local network and the number or type of packages received in messages 215a-b, set bandwidth utilization to no more than 5% per client computer system 205. Furthermore, the internet gateway device 200 could modify the acceptance rates on a per-package basis, or even globally, and further modify the refresh rates on a per-package or global basis, to thereby ensure adequate network utilization.

Figure 3:
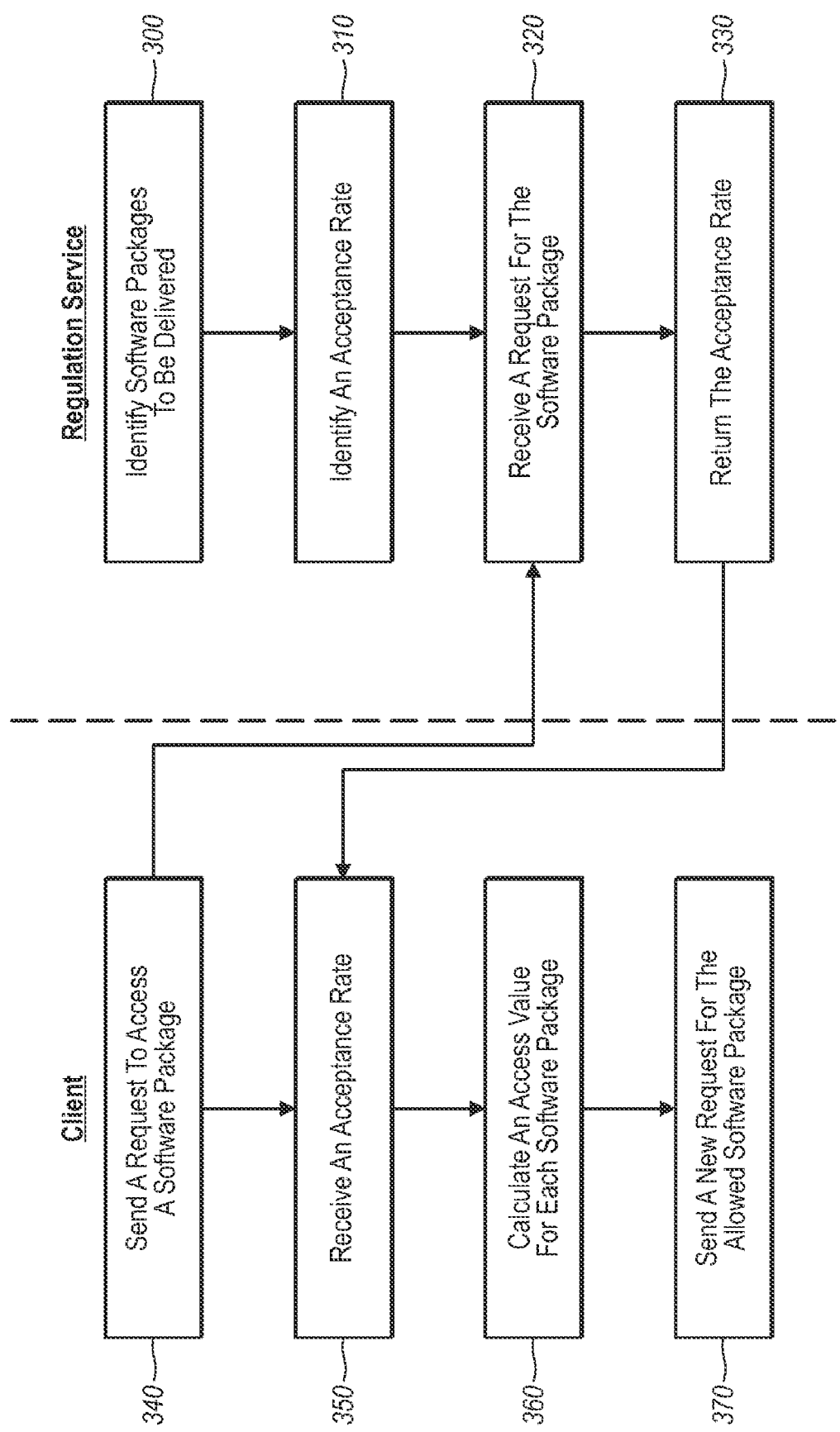
FIG. 3 illustrates flowcharts of methods comprising a series of acts from the perspective of a client and of a regulation service for delivering or accessing one or more software packages in a manner that minimizes network traffic.

Accordingly, FIGS. 1A-2 and the corresponding text illustrate or describe a number of different components and mechanisms for effectively managing network traffic and server loads on both a local and wide area network level during delivery of software content. In addition to the foregoing, implementations of the present invention can be described in terms of flowcharts of methods comprising one or more acts in a sequence for accomplishing a particular result. For example, FIG. 3 illustrates flowcharts of methods from the perspective of a client computer system (e.g., 105, 180, 205) and a server that distributes content (e.g., 115, 170) to the client. The methods of FIG. 3 are described below in terms of the components and mechanisms of FIGS. 1A-2.

For example, FIG. 3 illustrates that a method from the perspective of a regulation service (e.g., 115, 170), or server on which a regulation service is installed, of managing distribution of software content so that network traffic is minimized can comprise an act 300 of identifying software packages to be delivered. Act 300 includes identifying one or more software packages to be delivered to one or more computer systems over a network, wherein the one or more software packages are separated into priority levels. For example, FIG. 1A shows that regulation service manages high, medium, and low priority packages via database 125, while FIG. 1B shows that local organizational server receives these packages via one or more messages 165 from regulation service 115.

FIG. 3 also illustrates that the method from the perspective of the regulation service can comprise an act 310 of identifying at least an acceptance rate. Act 310 includes identifying at least an acceptance rate for each of the one or more software packages. For example, FIG. 1A shows that regulation service 115 maintains a database 130 of acceptance rate (and refresh rate) information associated with each particular software package 135, 140, etc. Similarly, FIG. 1B shows that organizational server 170 can deliver its own acceptance rate information, or otherwise use default values provided by regulation service 115. As previously mentioned, additional or alternative implementations include not sending the acceptance rate information, but rather maintaining the acceptance rate locally for comparison with received access values from the client.

In addition, FIG. 3 shows that the method from the perspective of the regulation service can comprise an act 320 of receiving a request for the software packages. Act 320 includes receiving one or more requests from one or more computer systems for any of the one or more software packages. For example, FIG. 1A shows that regulation service receives one or more access requests via messages 150a, 150b, etc. Similar or identical such communication is also shown or discussed with respect to FIGS. 1B and 2.

Furthermore, FIG. 3 shows that the method from the perspective of the regulation service can comprise an act 330 of returning at least the acceptance rate information. Act 330 includes sending to each of the one or more computer systems one or more responses that include at least the identified acceptance rate (and/or, in some cases the identified refresh rate) for each of the requested software packages. For example, FIGS. 1A and 2 show at least one implementation in which regulation service 115 sends such information via messages 155a-b/215a-b, while FIG. 2 shows an implementation in which the local organization server 170 can send this information via messages 185a-c.

From the client perspective, FIG. 3 shows that a method of accessing software content in accordance with instructions received from the regulation service so that network bandwidth is managed effectively can include an act 340 of sending a request to access a software package. Act 340 includes sending a request to one or more servers to access one or more software packages hosted by any of the one or more servers. For example, FIGS. 1A and 2 (similar communication occurs in FIG. 2B) show that the client computer system sends one or more requests to get software packages via messages 150a-b or 210a-b.

FIG. 3 also shows that the method from the perspective of the client can comprise an act 350 of receiving an acceptance rate. Act 350 includes receiving one or more responses that include at least an acceptance rate associated with each of the requested one or more software packages. For example, FIGS. 1A-2 show one particular implementation in which the regulation service 115 and/or local organizational server 170 prepare and send one or more messages (e.g., 155a-b, 185a-c, 215a-b) that include at least the specific acceptance rate for each specific software package. As previously mentioned and described herein, these messages may also include in some cases a refresh rate, or modification to a prior refresh rate, as applicable.

In addition, FIG. 3 shows that the method from the client perspective can comprise an act 360 of calculating an access value for the software packages. Act 360 includes calculating an access value for each of the one or more software packages. For example, FIG. 1A shows that client computer system 105a has calculated different access values (e.g., random number between 1-100) for each of software packages 135, 140, and 145, etc., while client computer system 105b has calculated its own, different access values for the same software packages. As previously discussed, this differential calculation of access values per each client computer system and per each software package ensures that not all of the client computer systems can access the same software package at the same time.

Furthermore, FIG. 3 shows that the method from the client perspective can comprise an act 370 of sending a new request for the allowed software packages. Act 370 includes sending one or more new requests to the any of the one or more servers to access each of the one or more software packages for which the calculated access value is within the acceptance rate for the corresponding software package. For example, as previously discussed with respect to FIGS. 1A-2, each client computer system can send a new access request to receive a software update. In some cases, the new access request can include an access value. While, in other cases, the client only sends the new access request because the locally generated access value matches is within the received acceptance rate for a given software package, and thus the client may not send the calculated access value.

In either case, the client computer system can then download the particular software package where the calculated access value permits it, or otherwise receive a new message with the current acceptance rate and refresh rate for any or all of the remaining software packages (i.e., not yet downloaded). Accordingly, FIGS. 1A-3 and the corresponding text provide a number of mechanisms and implementations that effectively modulate network bandwidth when distributing software content.

In particular, and by way of summary, at least one implementation includes the client making determinations about when to download without subsequent server/regulation service verification. In this implementation, the server sends acceptance rate information to the client, and potentially also refresh rate information, whereby the client computer system only downloads a software update upon its own determination that an access value matches a received acceptance rate for a given software package. In another implementation, the server and client both make determinations about when to download. For example, the server sends the acceptance rate information, and potentially also the refresh rate information. In this case, however, the client generates an acceptance value for each software package, and the client then only sends a request to download when an access value fits within the most recently received acceptance rate information. The server then only grants the new request upon verifying that an access value received from the client matches the current acceptance rate.

In still a third implementation, only the server makes determinations about when the client can download a software package. In this implementation, for example, the client never receives an acceptance rate. The client nevertheless generates an access value, and submits a request with the access value in order to access a software package (e.g., in accordance with received refresh rate values). The regulation service, which maintains the acceptance rate information locally, only allows the access request upon determining that the received access value is within the current acceptance rate.

One will appreciate that these components and mechanisms can be applied broadly across a wide range of implementations and architectures (from local area networks to wide area networks) to ensure network operability even where tends, thousands and even millions of computer systems may attempt to retrieve the same content at the same (or approximately the same) time. In particular, one will appreciate that the principles described herein can be applied not only to software packages in the form of iterative software updates, but also to various new software content downloads, which may or may not be considered an "update" as such to prior software.

The embodiments of the present invention may comprise a special purpose or general-purpose computer including various computer hardware, as discussed in greater detail below. Embodiments within the scope of the present invention also include computer-readable media for carrying or having computer-executable instructions or data structures stored thereon. Such computer-readable media can be any available media that can be accessed by a general purpose or special purpose computer.

By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

We claim:

1. At a regulation service in a computerized environment, the regulation service being configured to distribute software content in the form of one or more software packages to one or more client computer systems, a method of the regulation service managing distribution of the software content so that network traffic is minimized, comprising the acts of:
   identifying one or more software packages to be delivered to one or more computer systems over a network, wherein the one or more software packages are separated into priority levels;
   identifying at least an acceptance rate for each of the one or more software packages;
   exposing a web service for receiving requests from one or more computer systems for any of the one or more software packages and for transmitting responses to the requests to the one or more computer systems, wherein requests received by the web service and responses transmitted by the web service are secured using transport layer security (TLS);

receiving, via the web service, one or more requests, from an internet gateway device (IGD) that provides internet access to one or more computer systems, for any of the one or more software packages, the one or more requests being secured using TLS, wherein the request includes IGD information that specifies the number of computer systems to which the internet gateway device provides internet access, and the internet bandwidth of the IGD;

based on the IGD information, determining bandwidth usage limitations for the one or more computer systems that connect to the internet through the IGD that will govern the one or more computer systems' access to the one or more software packages; and sending, via the web service, to the IGD one or more responses that include the identified acceptance rate for each of the requested software packages as well as the bandwidth usage limitations, the one or more responses being secured using TLS, and wherein the IGD modifies the acceptance rate for at least one of the requested software packages and forwards the acceptance rate for each of the requested software packages, including the modified acceptance rate for the at least one of the requested software packages, to the one or more computer systems, and wherein the bandwidth usage limitations instruct the IGD to limit a particular computer system's maximum bandwidth utilization while downloading one of the one or more software packages.

2. The method as recited in claim 1, wherein the one or more responses include instructions for a client computer system to generate one or more access values for comparison with the identified acceptance rate for each of the requested software packages.

3. The method as recited in claim 1, wherein the acceptance rate and a refresh rate are determined separately for software packages in each priority level.

4. The method as recited in claim 1, further comprising an act of revising at least one of the acceptance rate and a refresh rate in response to any one or more of receiving input from a server administrator, or identifying lapse of a time duration.

5. The method as recited in claim 1, further comprising an act of revising at least one of the acceptance rate and a refresh rate in response to any one or more of identifying one or more client computer system properties, or identifying one or more network traffic properties.

6. The method as recited in claim 1, further comprising an act of receiving one or more additional requests from the client computer system to access at least one of the one or more software packages, the one or more additional requests including an access value generated by the client computer system for the at least one software package.

7. The method as recited in claim 6, further comprising the acts of:
identifying that the access value in the one or more additional requests is outside of an acceptance rate corresponding to the at least one software package; and
returning to the client computer system at least one of a new acceptance rate and a new refresh rate for the at least one software package.

8. The method as recited in claim 7, further comprising an act of receiving one or more subsequent requests from the client computer system to access the at least one software package, the one or more subsequent requests including the access value generated for the at least one software package.

9. The method as recited in claim 8, further comprising the acts of:

identifying that the access value in the one or more subsequent requests is within the acceptance rate corresponding to the at least one software package; and
providing the at least one software package to the client computer system.

10. The method as recited in claim 8, wherein:
the acceptance rate has not changed prior to the additional and subsequent requests; and
the access value is a revised access value generated anew by the client computer system before the subsequent request.

11. The method as recited in claim 8, wherein:
the acceptance rate has been revised for at least one software package prior to the subsequent request; and
the access value, which has not changed before the subsequent request, fits within the revised acceptance rate.

12. The method as recited in claim 1, wherein a local network server comprises a different regulation service that receives the one or more software packages from the regulation service, which is external to the local network server, the method further comprising:
receiving the one or more software packages from the external regulation service;
determining, via the different regulation service at the local network server at least the identified acceptance rate for each of the one or more software packages for each computer system on the local network; and
sending to each computer system on the local network one or more messages that include the determined acceptance rate.

13. At a regulation service in a computerized environment, the regulation service being configured to distribute software content in the form of one or more software packages to one or more client computer systems, a computer program product comprising one or more computer storage media, not including signals, having computer executable instructions stored thereon that, when executed, cause one or more processors at the regulation service to perform a method comprising:
identifying one or more software packages to be delivered to one or more computer systems over a network, wherein the one or more software packages are separated into priority levels;
identifying at least an acceptance rate for each of the one or more software packages;
exposing a web service for receiving requests from one or more computer systems for any of the one or more software packages and for transmitting responses to the requests to the one or more computer systems, wherein requests received by the web service and responses transmitted by the web service are secured using transport layer security (TLS);
receiving, via the web service, one or more requests, from an internet gateway device (IGD) that provides internet access to one or more computer systems, for any of the one or more software packages, the one or more requests being secured using TLS, wherein the request includes IGD information that specifies the number of computer systems to which the internet gateway device provides internet access, and the internet bandwidth of the IGD;
based on the IGD information, determining bandwidth usage limitations for the one or more computer systems that connect to the internet through the IGD that will govern the one or more computer systems' access to the one or more software packages; and
sending, via the web service, to the IGD one or more responses that include the identified acceptance rate for each of the requested software packages as well as the bandwidth usage limitations, the one or more responses being secured using TLS, and wherein the IGD modifies the acceptance rate for at least one of the requested software packages and forwards the acceptance rate for each of the requested software packages, including the modified acceptance rate for the at least one of the requested software packages, to the one or more computer systems, and wherein the bandwidth usage limitations instruct the IGD to limit a particular computer system's maximum bandwidth utilization while downloading one of the one or more software packages.

14. The computer program product as recited in claim 13, wherein the one or more responses include instructions for a client computer system to generate one or more access values for comparison with the identified acceptance rate for each of the requested software packages.

15. The computer program product as recited in claim 13, wherein the acceptance rate and a refresh rate are determined separately for software packages in each priority level.

16. The computer program product as recited in claim 13, further comprising an act of revising at least one of the acceptance rate and a refresh rate in response to any one or more of receiving input from a server administrator, or identifying lapse of a time duration.

17. The computer program product as recited in claim 13, further comprising an act of revising at least one of the acceptance rate and a refresh rate in response to any one or more of identifying one or more client computer system properties, or identifying one or more network traffic properties.

18. The computer program product as recited in claim 13, further comprising an act of receiving one or more additional requests from the client computer system to access at least one of the one or more software packages, the one or more additional requests including an access value generated by the client computer system for the at least one software package.

19. The computer program product as recited in claim 18, further comprising the acts of:
   identifying that the access value in the one or more additional requests is outside of an acceptance rate corresponding to the at least one software package; and
   returning to the client computer system at least one of a new acceptance rate and a new refresh rate for the at least one software package.

20. At a regulation service in a computerized environment, the regulation service being configured to distribute software content in the form of one or more software packages to one or more client computer systems, a method of the regulation service managing distribution of the software content so that network traffic is minimized, comprising the acts of:
   identifying one or more software packages to be delivered to one or more computer systems over a network, wherein the one or more software packages are separated into priority levels;
   identifying at least an acceptance rate for each of the one or more software packages;
   exposing a web service for receiving requests from one or more computer systems for any of the one or more software packages and for transmitting responses to the requests to the one or more computer systems, wherein requests received by the web service and responses transmitted by the web service are secured using transport layer security (TLS);
   receiving, via the web service, one or more requests, from an internet gateway device (IGD) that provides internet access to one or more computer systems, for any of the one or more software packages, the one or more requests being secured using TLS, wherein the request includes IGD information that specifies the number of computer systems to which the internet gateway device provides internet access, and the internet bandwidth of the IGD;
   based on the IGD information, determining bandwidth usage limitations for the one or more computer systems that connect to the internet through the IGD that will govern the one or more computer systems' access to the one or more software packages;
   sending, via the web service, to the IGD one or more responses that include the identified acceptance rate for each of the requested software packages as well as the bandwidth usage limitations, the one or more responses being secured using TLS, and wherein the IGD modifies the acceptance rate for at least one of the requested software packages and forwards the acceptance rate for each of the requested software packages, including the modified acceptance rate for the at least one of the requested software packages, to the one or more computer systems, and wherein the bandwidth usage limitations instruct the IGD to limit a particular computer system's maximum bandwidth utilization while downloading one of the one or more software packages;
   receiving one or more additional requests from the client computer system via the IGD to access at least one of the one or more software packages, the one or more additional requests including an access value generated by the client computer system for the at least one software package;
   identifying that the access value in the one or more additional requests is outside of an acceptance rate corresponding to the at least one software package; and
   returning to the client computer system via the IGD a new acceptance rate and a new refresh rate for the at least one software package, wherein the IGD modifies the new acceptance rate based on current bandwidth usage by other client computer systems downloading the at least one software package.

* * * * *